Dec. 10, 1935.  E. ROIRANT  2,023,746
ROTATING DRAWING OFF BASINS ATTACHED TO GLASS FURNACES
Filed Nov. 8, 1934
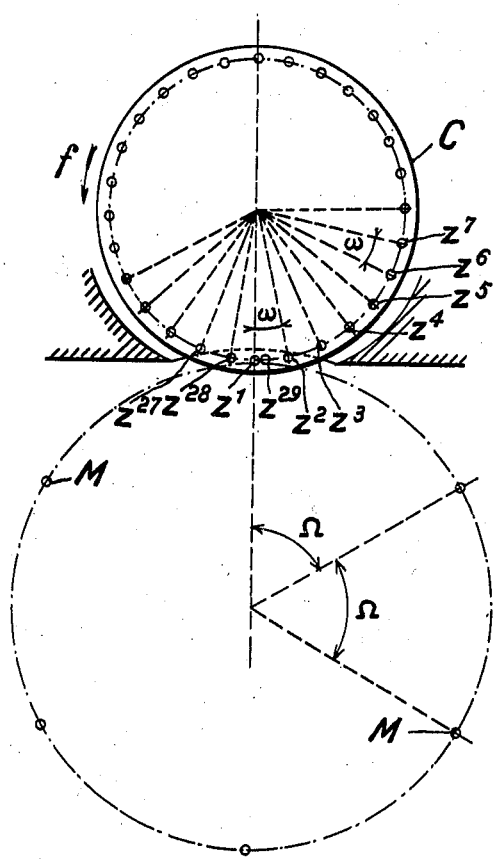
E. Roirant
INVENTOR
By: Glascock Downing Seebold
ATTYS.

Patented Dec. 10, 1935

2,023,746

UNITED STATES PATENT OFFICE 2,023,746

ROTATING DRAWING OFF BASINS ATTACHED TO GLASS FURNACES

Emile Roirant, Paris, France, assignor to Société Anonyme d'Etudes et de Constructions d'Appareils Mécaniques pour la Verrerie, Paris, France Application November 8, 1934, Serial No. 752,132
In France September 20, 1934

1 Claim. (Cl. 49—56)

The invention described in the United States patent application filed on the 3rd February 1934, under Serial No. 709,596, concerned rotating drawing off basins attached to glass furnaces and receiving an intermittent movement of rotation synchronically with the intermittent movement of rotation of parison moulds drawing off glass from these basins and arrested at the time of suction.

The said patent application also comprised a plant in which the intermittent movement of rotation of the basin is ruled by such a law that a mass of glass, from which glass has been drawn off, is displaced relatively to the drawing off point, after the basin has effected a full revolution, so that any mass of glass, degraded by a drawing off operation, executes several revolutions before becoming stationary again at the suction station.

The present invention has for its object to improve the operation of such plants and consists in giving to the angle of intermittent rotation of the basin a small value relatively to the angle of intermittent rotation of the drawing off moulds.

In these conditions, when a given drawing off mould returns to the suction or drawing off point after a cycle of the machine, the basin, during this cycle, has effected only a fraction of a revolution.

By designating by $\omega$ the angle of intermittent rotation of the basin, by $\Omega$ the angle of intermittent rotation of the drawing off moulds, if the ratio $$\frac{\omega}{\Omega}$$

is equal to ⅓, to ¼, or to ⅕, etc..., the zones in which a mould has drawn off glass each remain within the furnace during a period of time which corresponds to 3, 4 or 5 times, etc..., the duration of the cycle of the machine. Any zone of the mass, which has just been cooled by a drawing off operation, remains, consequently, for a very long time in the re-heating region on the furnace side) before returning to the portion exposed to the atmosphere.

This feature can be associated as follows with the above mentioned law of movement:

If, in the example considered above, it is moreover assumed that a zone in which a suction has been effected makes, for instance three revolutions before becoming stationary again at the suction point, the interval of time separating these two suction or drawing off operations in the same zone will be equal to (3×3)=9 times, or (3×4)=12 times, or (3×5)=15 times the duration of a cycle of the machine.

Use can thus be made of a basin of very small diameter, owing to the fact that the re-heating of a cooled zone continues during a very long time before this zone returns to the suction or drawing off point in contact with a drawing off mould.

These features of the invention are illustrated in the accompanying drawing.

The basin C receives an intermittent movement of rotation, the periods of stoppage of which occur at the same initial instants and the same durations as the periods of stoppage of the drawing off moulds M, which are six in number in the example under consideration.

$Z^1$ designates the cooled trail left by a drawing off mould after a drawing off operation; $Z^2$, $Z^3$, $Z^4$... $Z^{27}$, $Z^{28}$ designate the successive stations of this trail $Z^1$ at the various points of stoppage of the basin C in the re-heating zone; it will be seen that, after the station $Z^{28}$, this zone, in which glass had been drawn off at the beginning of the revolution, comes to $Z^{29}$, beyond the drawing off point and, consequently, is not subjected to any drawing off operation. The mould which, at this moment, reaches the drawing off point, will therefore draw off nondegraded glass.

Moreover, it will be seen that, when the machine has effected a full revolution (six stoppages of the moulds M), the basin has moved only through a fraction of a revolution, so that the cooled zone is subjected to a long period of reheating before returning to the narrow uncovered sector.

I claim:

A method of drawing off glass in a rotating basin supplied by a glass furnace and almost completely covered by the hood of the furnace so that only a narrow uncovered sector is exposed to the outer air, said method consisting in effecting the drawing off operation at a fixed station corresponding to the uncovered sector by means of a series of molds to which an intermittent movement of rotation is imparted and which are successively stopped at the said fixed station, and in imparting to the basin an intermittent movement of rotation synchronous with the intermittent movement of rotation of the molds, the laws of the two movements being such that the number of revolutions effected by the molds during a predetermined period is a multiple of the number of revolutions effected by the basin during the same period.

EMILE ROIRANT.